United States Patent [19]

Morita

[11] Patent Number: 4,934,834
[45] Date of Patent: Jun. 19, 1990

[54] LINEAR MOTION ROLLING GUIDE UNIT MADE OF RESIN

[75] Inventor: Kunihiko Morita, Koganei, Japan

[73] Assignee: Nippon Thompson Co., Ltd., Takanawa, Japan

[21] Appl. No.: 471,936

[22] Filed: Jan. 29, 1990

[30] Foreign Application Priority Data

Aug. 18, 1989 [JP] Japan .................. 1-211364

[51] Int. Cl.⁵ .................................... F16C 29/06
[52] U.S. Cl. ........................................ 384/45; 384/43
[58] Field of Search ...................... 384/43, 44, 45; 464/168

[56] References Cited

U.S. PATENT DOCUMENTS

| | | | |
|---|---|---|---|
| 4,376,557 | 3/1983 | Teramachi | 384/45 |
| 4,444,443 | 4/1984 | Teramachi | 384/43 |
| 4,582,369 | 4/1986 | Itoh | 384/45 X |
| 4,659,239 | 4/1987 | Teramachi | 384/45 |
| 4,674,893 | 6/1987 | Teramachi | 384/43 X |

*Primary Examiner*—Thomas R. Hannon
*Attorney, Agent, or Firm*—Rogers & Killeen

[57] ABSTRACT

There is provided a linear motion rolling guide unit mainly comprising a square pillar-shaped long track rail having rail side track grooves formed in the longitudinal direction on both side surfaces of the rail, a casing having an inverse U-shaped cross section mounted over the rail through a concave portion, a pair of side plates fixedly joined to both longitudinally end surfaces of the casing, and rolling ball return passages formed in parallel in correspondence to the casing side track grooves. An endless circulating passage for rolling elements is formed by coupling at the extreme ends, the casing side track grooves and the return passages extending in parallel thereto by opposingly arranged arc-shaped direction turning passages. The track rail, casing, and side plates are made of high performance engineering plastics. Cylindrical projections and/or arcuate bridge-shaped U-turn tracks are formed on both longitudinally end wall surfaces of the casing. Projection inserting holes and/or U-turn track receiving holes are formed on one of side surfaces of each of the side plates at the positions corresponding to the projections and/or the U-turn tracks of the casing to be jointed therewith. By inserting and fixing the projections of the casing into the holes of the side plates in a snap-fitting manner, the casing and the side plates are accurately and fixedly joined. Thus, the direction turning passages, return passages, and track surfaces are easily accurately positioned to form endless ball circulating passages within the unit. The unit can be easily cheaply manufactured with a light weight and can be used in the severe physical and chemical conditions.

17 Claims, 5 Drawing Sheets

LINEAR MOTION ROLLING GUIDE UNIT MADE OF RESIN

BACKGROUND OF THE INVENTION

1. Field of the Invention

The present invention relates to a linear motion rolling guide unit in which almost or all of the component parts are made of what is called high performance engineering plastics as a resin which is excellent in heat resistance, chemical resistance, and mechanical and physical strengths and, more particularly, to a linear motion rolling guide unit which can effectively be used even in special use circumstances, for instance, under severe physical and chemical conditions in manufacturing of chemicals, in the vacuum or water such as sea water, and the like.

2. Description of the Related Background Art

In a conventional linear motion rolling guide unit, only limited component parts, for instance, side plates which are attached to both ends in the longitudinal direction of a casing are made of a resin such as POM (polyoxymethylene), PBT, PES, or the like and the other component parts which require a high strength in operation are made of steel or iron. However, in recent years, various kinds of resins having physical and mechanical strength substantially equal to that of the steel have been developed. There has been proposed that those new resinous materials are used in place of the conventional parts made of steel.

Hitherto, since almost all of component parts of a linear motion rolling guide unit are manufactured by a metal material such as steel or the like, the total weight of the unit increases and the metal component parts are coupled and fixed by using bolts or the like. Thus, the coupling works are complicated and the costs involved also increase. Further, the linear motion rolling guide unit made of metal cannot be used in the special condition such as in the oil-free or non-lubricating, low-noise, non-magnetic, or chemical resistant circumstances or the like.

The present invention is directed to the use of newly developed resins having chemical and physical strengths. The component parts of linear motion rolling guide unit are formed to be preferably formed by those resins. Thus, new using fields and effects which could not be obtained by any conventional linear motion rolling guide units are accomplished by the present invention.

SUMMARY OF THE INVENTION

It is an object of the invention to provide a linear motion rolling guide unit in which the component parts are formed by the above novel resins or by a combination thereof and the unit is constructed by assembling those component parts, wherein a small coefficient of friction can be obtained by using the rolling friction and, further, the unit can also be used without any trouble even in vacuum or water containing the sea water or the corrosive chemicals.

The above object is accomplished by a linear motion rolling guide unit comprising:

A linear motion rolling guide unit (10) comprising:

a square pillar-shaped long track rail (1);

rail-side track grooves (1a) formed on both side surfaces of the track rail (1) in an extended symmetrical relation relative to its longitudinal axis;

a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);

corresponding to the rail-side track grooves (1a) being formed casing-side track grooves (2a) on both the opposite inner side walls of said laterally opposite leg portions (2d) of the casing (2), extending by a distance slightly shorter than the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being provided arc-shaped direction turning passages (6), thereby forming an endless ball circulating passage within each of the laterally opposite leg portions (2d), a number of rolling members (8) being inserted between both the facing track grooves (1a and 2a) as well as within said endless ball circulating passage, and a pair of side plates (4) each having a cross-sectional shape conforming to the cross-sectional shape of the casing (2) and adapted to be integrally attached to both the longitudinally end wall surfaces of the casing (2);

said unit is characterized in that the track rail (1), casing (2), and side plates (4) are made of high performance engineering plastics, a plurality of generally cylindrical projections (3a or 3b) longitudinally project on the longitudinally end wall surfaces of said casing (2) with the corresponding number of projection inserting holes (4a) each having a diameter slightly smaller than said cylindrical projection (3a and 3b) being correspondingly formed on the side wall surfaces of said plates (4) so that said side plates (4) may be integrally fixed on both end wall surfaces of the casing (2) in a snap-fitting fashion.

According to more further aspect of the invention, the above object can be accomplished by a linear motion rolling guide unit (10) comprising:

a square pillar-shaped long track rail (1);

rail-side track grooves (1a) formed on both side surfaces of the track rail (1) in an extended symmetrical relation relative to its longitudinal axis;

a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);

corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being integrally provided, on each of the longitudinally opposite end wall surfaces of the casing (2), arcuate bridge-shaped U-turn tracks (3d), a pair of side plates (4) each having a cross-sectional shape conforming to the cross-sectional shape of the casing (2), adapted to be integrally attached to both the longitudinally end wall surfaces of the casing (2), and a number of rolling members (8) being inserted between both the facing track grooves (1a and 2a), said unit is characterized in that the track rail (1), casing (2), and side plates (4) are made of high performance engineering plastics, each of the above-mentioned side plates (4) has, on the casing-side side wall, horizontally semicircular recesses (6') at the horizontally symmetrical positions, adapted to snugly receive the above-mentioned arcuate bridge-shaped U-turn tracks (3d) therein in a snap-fitting fashion, thereby enabling to securely fitting said side plates (4) onto the longitudinally opposing end wall surfaces of the casing, while at the same time, forming arcuate direction turning passages (6) between the U-turn tracks (3d) and the inner wall surfaces of said horizontally semicircular recesses (6') so as to form endless ball circulating passages within the respective laterally opposite leg portions (2d) of the casing (2).

According to more further another aspect of the present invention, the above object can be accomplished by a linear motion rolling guide unit (10) comprising:

a square pillar-shaped long track rail (1);

rail-side track grooves (1a) formed on both side surfaces of the track rail (1) in an extended symmetrical relation relative to its longitudinal axis;

a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);

corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being integrally provided, on each of the longitudinally opposite end wall surfaces of the casing (2), arcuate bridge-shaped U-turn tracks (3d);

a pair of side plates (4) each having a cross-sectional shape conforming to the cross-sectional shape of the casing (2), adapted to be integrally attached to both the longitudinally end wall surfaces of the casing (2); and a number of rolling members (8) being inserted between both the facing track grooves (1a and 2a);

said unit is characterized in that the track rail (1), casing (2), and side plates (4) are made of high performance engineering plastics, each of the above-mentioned side plates (4) has, on the casing-side side wall, horizontally semicircular recesses (6') at the horizontally symmetrical positions, adapted to snugly receive the above-mentioned arcuate bridge-shaped U-turn tracks (3d) therein and a plurality of generally cylindrical projections (3a or 3b) longitudinally project on the longitudinally end wall surfaces of said casing (2) with the corresponding number of projection inserting holes (4a) each having a diameter slightly smaller than said cylindrical projecting being correspondingly formed on the mating side wall surfaces of said side plates (4), thereby enabling to securely fit said side plates (4) onto the longitudinally opposing end wall surfaces of the casing in a snap-fitting fashion, while at the same time, forming arcuate direction turning passages (6) between the U-turn tracks (3d) and the inner wall surfaces of said horizontally semicircular recesses (6') in the side plates so as to form endless ball circulating passages within the respective laterally opposite leg portions (2d) of the casing (2).

According to more further another aspect of the invention, the above object can be accomplished by a linear motion rolling guide unit (10) comprising:

a square pillar-shaped long track rail (1);

rail-side track grooves (1a) formed on both side surfaces of the track rail (1) in an extended symmetrical relation relative to its longitudinal axis;

a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);

corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of the corresponding rolling member return passages (5) being provided;

a pair of side plates (4) each having a cross-sectional shape conforming to the cross-sectional shape of the casing (2), adapted to be integrally attached to both the longitudinally end wall surfaces of the casing (2); and a number of rolling members (8) being inserted between both the facing track grooves (1a and 2a), said unit is characterized in that the track rail (1), casing (2), and side plates (4) are made of high performance engineering plastics, a plurality of generally cylindrical projects (3a or 3b) longitudinally project on the longitudinally end wall surfaces of said casing (2) with the corresponding number of projection inserting holes (4a) each having a diameter slightly smaller than said cylindrical projection being correspondingly formed on the mating side wall surfaces of said side plates (4) and each of the above-mentioned side plates (4) has, on the casing-side side wall, the arc-shaped direction turning passage (6″) provided at the horizontal symmetrical positions on the cross-sectional surface of each of the side plates (4), which has been formed by forming a notch having a semicircular horizontal cross section in each side plate, then centrally inserting and fixing a circulating passage spacer (7) having a smaller but analogous semi-circular horizontal cross section into the notch, and by press-fitting the side plates (4) onto both longitudinally end wall surfaces of the casing (2) in a snap-fitting manner, thereby forming the arc-shaped direction turning passages (6) in each of the side plates, endless ball circulating passages are formed within said casing (2).

DETAILED DESCRIPTION OF THE PREFERRED EMBODIMENTS

Figure 1:
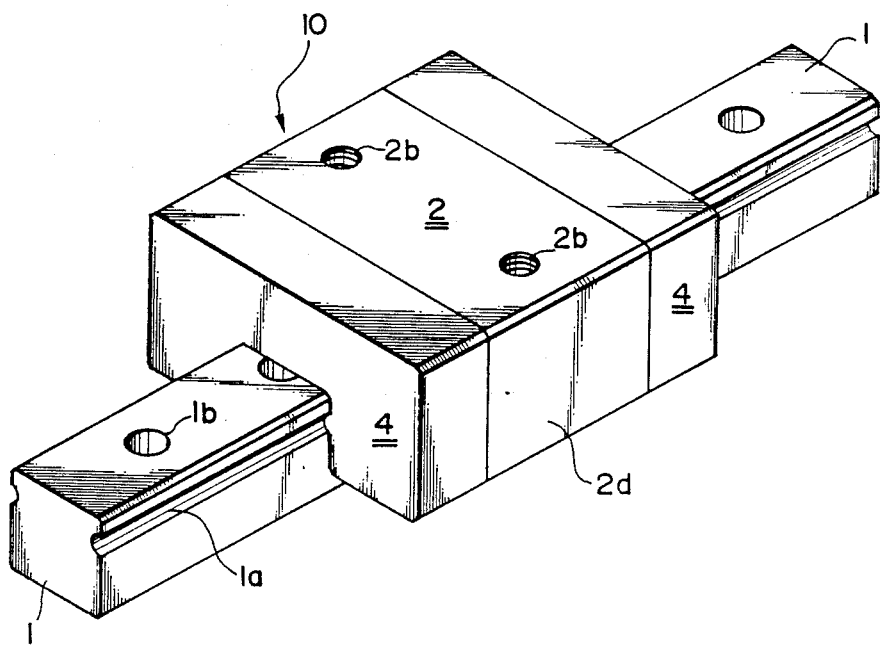
FIG. 1 is a perspective view of an embodiment of a linear motion rolling guide unit according to the present invention.

FIG. 1 is a perspective view of an embodiment of a linear motion rolling guide unit 10 according to the invention. Track grooves 1a for rolling members are formed in the longitudinal direction on both side-wall surfaces of a square pillar-shaped long track rail 1 so as to be symmetrical with respect to the cross section. Reference numeral 2 denotes a generally cubic or rectangular parallelepiped-shaped casing having a lower inner concave portion 2c of a generally U-shaped cross-sectional inverse U-shape which almost corresponds to the square cross-sectional upper portion of the track rail 1, thereby defining laterally opposing leg portions 2d. The casing 2 slidably straddle the track rail 1 at the lower inner concave portion 2c.

Figure 2:
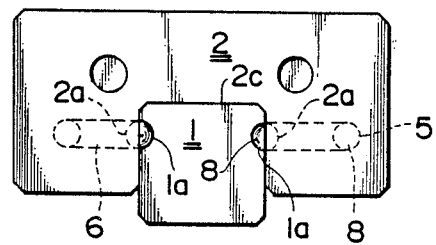
FIG. 2 is a frontal view of FIG. 1 and shows the first embodiment of the invention.

FIG. 2 is a frontal view of the unit of FIG. 1 and shows the first embodiment of the invention providing, within the casing 2, endless ball circulating passage in each of the laterally opposing leg portions 2d. Corresponding to the rail side track grooves 1a which are provided symmetrically on both side surfaces of the track rail 1 are formed track grooves 2a in parallel in the longitudinal direction on the opposite wall inner surfaces of the laterally opposing legs 2d of the casing having an inverse U-shaped cross section, thereby forming the casing-side track grooves 2a. It should be noted that in this embodiment, the endless ball circulating passage is formed within each of the laterally opposing leg portions 2d of the casing 2, so that the longitudinal length of the casing-side track groove 2a should be shorter than the longitudinal length of the leg portion 2d.

Figure 3:
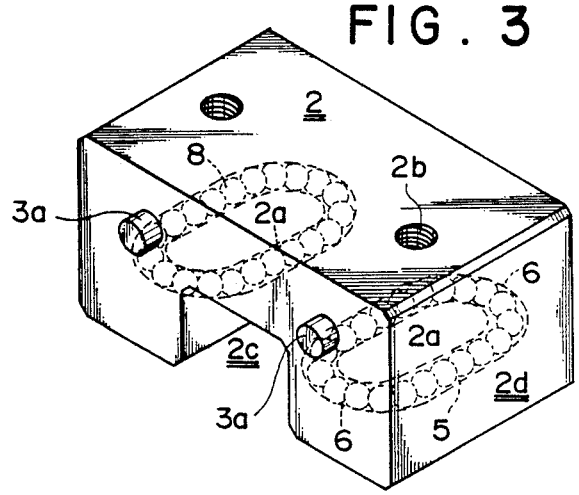
FIG. 3 is a perspective view of a casing in the first embodiment of the invention.

As will be clearly understood from FIG. 3 showing a perspective view of the casing 2 of the first embodiment, rolling member return passage 5 are provided in the longitudinal direction in the laterally opposing leg portions 2d of the casing 2 at the horizontal symmetrical positions of the cross section and are extended in parallel in the longitudinal direction with respect to the track grooves 2a of the casing 2 over substantially the same distance. The return passages 5 and the track grooves 2a are coupled by direction turning passages 6 that are provided at the longitudinally opposing portions within said laterally opposing leg portions 2d, thereby forming a pair of endless circulating passages for rolling balls at the horizontal symmetrical positions on the cross section of the casing 2. A number of rolling members, in the case of the present embodiment, rolling balls 8 are inserted between the opposite rail side track groove 1a and the casing-side track groove 2a, as well as the above-mentioned endless ball circulating passages thereby allowing the casing 2 mounted over the track rail 1 to effect free reciprocating sliding motion over the rail.

Figure 4:
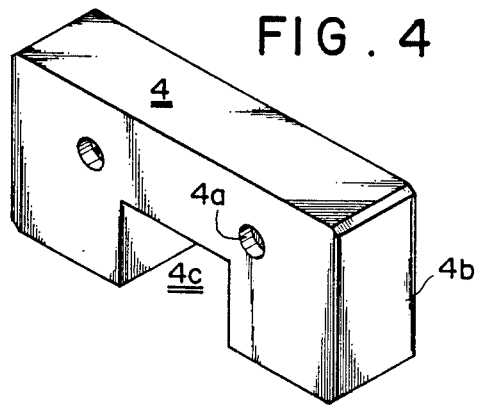
FIG. 4 is a perspective view of a side plate in FIG. 1, showing the first embodiment.

FIG. 4 is a perspective view of a side plate, wherein are provided a plurality of generally cylindrical projections 3a or 3b longitudinally projecting at the desired positions on the longitudinally end wall surfaces of the casing 2, while on the mating side plate are provided the corresponding number of projection inserting holes 4a each having a diameter slightly smaller than said cylindrical projections 3a are provided at the corresponding positions on the end wall surfaces of said side plates 4 so that said side plates 4 may be integrally fixed onto both end wall surfaces of the casing 2 in a snap-fitting fashion.

In the above-mentioned embodiment, use is made of side plates 4 on both the opposing end wall surfaces of the casing 2 but such side plates will not always be required, when the casing has been made of a resin of a high impact and high mechanical strength.

According to the second embodiment, as shown in FIGS. 1, 5, 6 and 7, the track rail 1, track grooves 1a, the casing excepting the ball turning passages provided on its opposing sidewalls, casing-side track grooves 2a, ball return passages, and side plates are substantially the same as the corresponding parts, in structure and configuration, therefore, in the following descriptions, the same parts will be denoted by the same reference numerals for all the embodiments described hereinafter.

Figure 5:
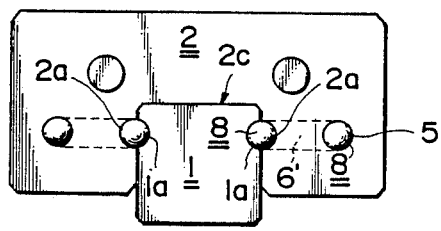
FIG. 5 is a frontal view of FIG. 1 but shows the second embodiment of the present invention.

FIG. 5 is a frontal view of the unit of FIG. 1 showing the second embodiment of the invention. Track grooves 2a corresponding to the rail-side track grooves 1a which are provided symmetrically on both side surfaces of the track rail 1 are formed in parallel with the longitudinal axis on the opposite wall inner wall surfaces of laterally opposite leg portions 2d which are defined in the casing 2 by its inner concave portion 2c having the inverse U-shaped cross section. Unlike the first embodiment, the casing-side track grooves 2a extend through its longitudinal axis with their extreme ends opening on the longitudinally opposed end wall surfaces of the casing 2. A number of rolling members, in the case of the present embodiment, rolling balls 8 are inserted between the opposite rail-side track groove 1a and the casing-side track groove 2a, thereby allowing the casing 2 mounted over the track rail 1 in straddled fashion to effect free reciprocating sliding motion over the rail.

Figure 6:
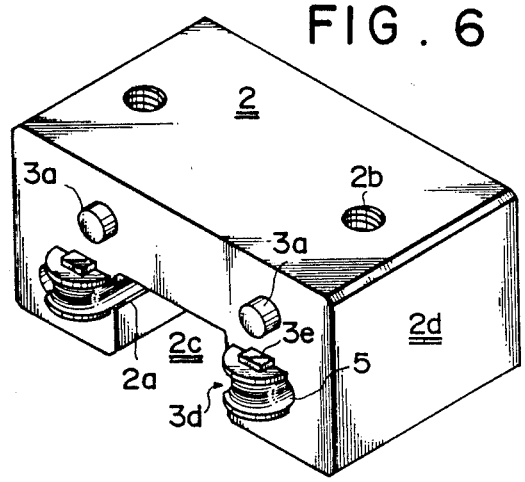
FIG. 6 is a perspective view of FIG. 5 showing the second embodiment of the present invention.

As clear from FIGS. 5 to 6 showing a perspective view of the casing 2 of the second embodiment, rolling member return passages 5 are provided in the longitudinal direction in the casing 2 at the horizontal symmetrical positions of the cross section and are extended in parallel in the longitudinal direction with respect to the track grooves 2a of the casing 2 with their extreme ends opening on the longitudinally opposing end wall surfaces of the casing 2. The return passages 5 and the track grooves 2a are coupled by direction turning passages 6 formed within the mating side plates 4, which will be explained hereinbelow, thereby forming a pair of endless ball circulating passages for the rolling members at the horizontal symmetrical positions on the cross section of the casing 2.

Figure 7:
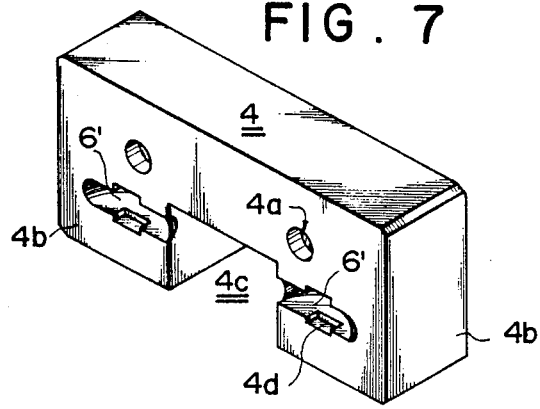
FIG. 7 is a perspective view of a side plate in FIG. 1 and shows the second embodiment of the invention.

The side walls 4 each having ball direction turning passages 6 (FIG. 7) are adapted to be fixed on to the longitudinally opposite end walls of the casing 2. As shown in FIG. 7, the direction turning passages 6 are formed: notches each having a semicircular horizontal cross section and having a thickness enough to pass the rolling members are formed in the longitudinal direction at the horizontal symmetrical positions on the cross section of the side plates 4, that is, in both leg portions 4b of the side plates 4. On the other hand, arcuate bridge-shaped U-turn tracks 3d are integrally formed on the longitudinally opposing end wall surfaces of the casing 2 are shown in FIG. 6 at the positions corresponding to the notches formed in the mating side plates 4. Each of the U-turn tracks 3d has a semicircular horizontal cross section essentially similar to that of the notch. Each of the U-turn tracks 3d may have different sizes depending on the necessity of fixing projections 3a, 3b to be provided on the side plates 4 about which will be explained more details in the followings:

Namely, the U-turn track 3d may take a substantially the same or slightly larger thickness than the mating notch so that the former may snugly be fitted into the mating notch of side plate in a simple snap-pressing action. In this case, the projections 3a and the mating holes 4a on FIGS. 6 and 7 may be omitted.

According to a modification as shown in FIGS. 6 and 7 of the above-mentioned, the U-turn track 3d has a thickness slightly smaller than that of the mating notch to be inserted thereinto snugly but easily, about which embodiment will be explained hereinafter.

According to the first mentioned embodiment, it will become clear that the side plates 4 can be simply press-fitted onto the longitudinally opposing end walls of the casing 2 in a snap-fitting fashion while at the same time forming the arc-shaped direction turning passages 6 for rolling members 8.

Namely, the bridges 3d may be concentrically inserted into the notches, thereby forming the arc-shaped direction turning passages 6 of the rolling balls between both the casing 2 and the side plate 4.

Figure 8:
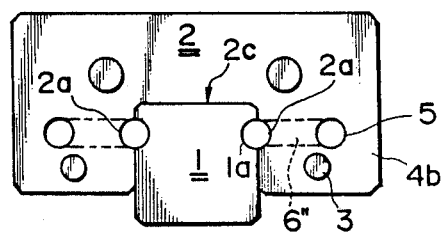
FIG. 8 is a frontal view of the third embodiment of the invention.

When the side plates 4 are joined and fixed to both the longitudinally opposing end walls of the casing 2 in a snap manner according to the above-mentioned second modification, it is necessary that the bridge-shaped U-turn tracks 3d are securely fitted into the notched portions of the side plates 4 and the complete arc-shaped direction turning passages 6 are formed in the side plates 4. For this purpose, a pair of positioning guide projections 3a are formed on the longitudinally opposing end wall surfaces of the casing 2 and adjacent the bridge-shaped U-turn track 3d as shown in FIG. 8, while a pair of positioning guide grooves 4a conforming to the projections 3a are formed in the upper and lower edge portions adjacent the notched openings on the side wall surfaces of the side plate 4.

Further, cylindrical projections 3a and 3b, which will be explained hereinafter, and snap-fitting type projection inserting holes 4a conforming to the projections 3a and 3b are formed on the abutting end surfaces of the casing 2 and each side plate 4, thereby enabling the casing 2 and side plates 4 to be fixedly joined and attached in a snap-fitting manner.

Such a fixed joint as being realized by the above-mentioned two modifications can be accomplished only by forming the casing 2 and side plates 4 by plastics. As shown in FIGS. 1, 5, 6 and 7, the side plate 4 is provided with a cross-sectional surface which conforms with the cross-sectional surface of the casing 2. The arc-shaped direction turning passages 6' are completed by the snap-fitting engagement between the casing and side plates as mentioned above. Namely, the integrated fixed joint of the casing 2 and each side plate 4 is accomplished by a fixing attaching method, which will be explained hereinlater.

It should be noted that the linear motion rolling guide unit of the invention is characterized in that almost or all of the component parts of the unit, that is, the track rail 1, casing 2, side plates 4, and the like are made of high performance engineering plastic such as PEEK resin, PES resin, PPS resin, PI resin, PAI resin, modified PPO resin, PEI resin, etc. Therefore, the snap-fitting engagement of the arcuate bridge-shaped U-turn tracks 3d into the corresponding notches of the side plates 4 forming direction turning passages 6 in the side plates 4 can be simply and securely realized. In the manner similar to the above and, at the same time, the side plates 4 can also be fixedly attached to the longitudinally opposing end wall surfaces of the casing 2 by a simple method which will be explained hereinlater.

As shown in FIGS. 3, 6, 9, 11 and 12, when the casing 2 is molded by a resin, a plurality of generally cylindrical projections 3a which project in the longitudinal direction are integrally formed at predetermined positions on the longitudinally opposing end wall surfaces of the casing 2. As shown in FIG. 7, the projection inserting holes 4a for receiving the cylindrical projections 3a in a snap-fitting manner are provided by molding on one of the side wall surface of the side plate 4 which is to be joined with the end wall surface of casing 2 at the positions corresponding to the mating projections 3a. The corresponding projections 3a and inserting holes 4a are joined in a snap-fitting manner when the casing 2 and the side plates 4 are joined, since the overall diameters of the projections 3a or 3b are generally made slightly larger than those of the mating inserting holes 4a as will be fully described hereinafter. Thus, the side plates 4 can be fixed to both end wall surfaces of the casing 2 in the possible simplest operation. The casing-side track grooves 2a and the relative ball return passages 5 are coupled at their both extreme ends by arcuate ball return passages 6 which are in turn constructed by associating notches formed on both side plates 4 with the arcuate bridge-shaped U-turn track 3d provided on the longitudinally opposing end wall surfaces of the casing, thereby completing endless ball circulating passages therebetween.

Figure 11:
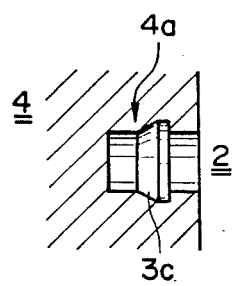
FIGS. 11 and 12 are schematic diagrams of a side plate fixing and attaching cylindrical projection provided for casings in the second and third embodiments of the invention.
Figure 12:
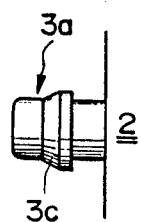

Such a snap-fitting type joint fixing method as is used in the invention is a well-known technique in itself and widely used. For instance, in the case of the cylindrical projections 3a of the invention, as shown in FIGS. 11 and 12, an enlarged diameter portion is provided on the outer peripheral surface of the tip end of a projection, a plurality of which may be integrally molded on the casing end wall surface. The projection inserting hole 4a having an inner diameter which is adapted to be snap-fitted to the enlarged diameter portion 3c of the projection is formed at one side wall surface of side plate 4. The above snap-fitting type joint can be performed by engaging the cylindrical projections 3a and the projection inserting holes 4a.

Figure 13:
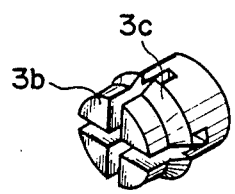
FIG. 13 is a perspective view of the deformed side plate fixing and attaching projection of each of FIGS. 8 and 9.

FIG. 13 shows another embodiment of a cylindrical projection of the invention. To increase the fixing joint force of the projecting portion, a diameter of the enlarged portion 3c of the tip portion of a projecting portion is set to a large value. Cross slits 3b are formed as in FIG. 13 in the tip portion of the projecting portion 3a, thereby increasing the elastic deforming rate of the projecting portion. With such a structure, the plastic deformation which might occur when the tip portion of the projecting portion 3a is fitted into the projection inserting hole 4a can be greatly prevented.

Figure 9:
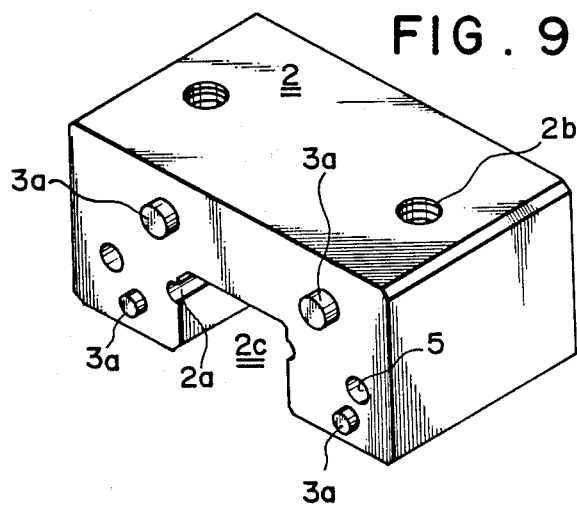
FIG. 9 is a perspective view of a casing in the third embodiment of the invention.
Figure 10:
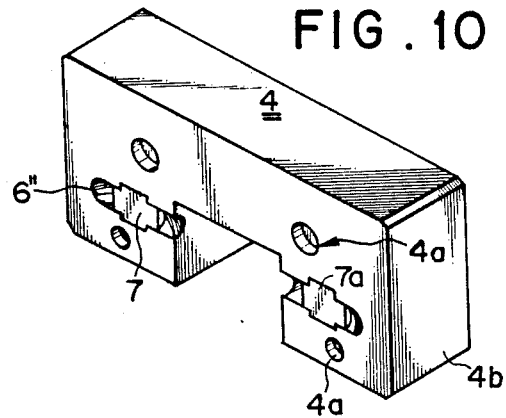
FIG. 10 is a perspective view of a side plate in the third embodiment of the invention.

FIGS. 8 to 10 show a construction embodying a more simplified snap-fitting type joint fixing between the casing 2 and the side plate 4 according to the third embodiment of the invention.

Likewise the above-mentioned embodiments, in FIGS. 8 to 10 also, the parts having the same constructions as those employed in the first to second embodiments are designated by the same reference numerals. More practically, the structure of the rolling guide unit 10 consisting of casing 2, trail rail 1, rail-side track grooves 1a, casing-side track grooves 2a, ball return passages 5, side plates 4 and direction turning passages 6 of the side plates 4, snap-fitting engagement between the casing 2 and the side plates via a plurality of projecting portions 3a and the mating holes 4a and the like are the same as those in the first embodiment. Only in the method for the formation in the side plates 4 of the direction turning passages for rolling members the third embodiment differs from the second embodiment.

A special construction of the third embodiment of the invention excluding the constructions common to those in the first to second embodiments will now be described with reference to the attached drawings.

Explaining the construction of the third embodiment of the invention, as shown in FIGS. 8 to 10, direction turning passages 6" are provided in each of the side plates 4 to be fixed onto the longitudinally opposing end walls of the casing 2. Each of the direction turning passages 6 is so formed in the side plates 4 that a notch having a semicircular horizontal cross section and having a thickness enough to pass the rolling members is first formed extending in the longitudinal direction at each of the horizontal symmetrical positions of the side plate 4, that is, in each of both the leg portions 4b of the side plate 4. Such a construction is similar to that in the second embodiment. However, in the third embodiment, a separate circulating passage spacer 7 having a semicircular horizontal cross section of a small diameter than that of the notch is concentrically inserted into the notch, thereby forming an arc-shaped direction turning passage 6" for rolling balls in each of the side plates 4. In the present embodiment as shown in FIG. 10, the base portion of the circulating passage spacer 7 is provided with a pair of opposing flange portion 7a. The spacer 7 is fitted and fixed in a snap-fitting manner into the mating engaging recess having a shape similar to the flange portion 7a formed in the opposing edge portions of the notch. Such a fixing joint can be realized by forming both the side plates 4 and the spacers 7 from plastics. As shown in FIG. 1, each side plate 4 has a cross section conforming with the cross section of the casing 2. As will be explained hereinlater, the arc-shaped direction turning passages 6" are formed by a snap-fitting engagement of the casing 2 with the mating side plates 4 thereby integrally and securely attaching them together. Thus, endless ball circulating passages for rolling members can be formed within the units 10.

Similar to the first to second embodiments, the third embodiment of the invention is also characterized in that almost or all of the component parts of the unit 10, that is, the track rail 1, casing 2, side plate 4, circulating spacers 7 forming the direction turning passage 6" of rolling members in the side plates 4, and the like are made of high performance engineering plastics such as PEEK resin, PES resin, PPS resin, PI resin, PAI resin, modified PPO resin, PEI resin, and the like. Therefore, the spacers 7 can be brought into engagement with the side plates 4 in a snap-fitting manner. Similarly to the above, the side plates 4 which have been completed as mentioned above can also be securely attached to the longitudinally opposing end wall surfaces of the casing 2 by a simple method as will be explained hereinlater.

As in the second embodiment, when the casing 2 is molded with a resin, a plurality of generally cylindrical projections 3a (refer to FIGS. 11 to 13) which project at appropriate positions from the longitudinally opposite end wall surfaces of the casing 2 are integrally formed by molding. As shown in FIG. 10, the projection inserting holes 4a into which the projections 3a are inserted and fixed in a snap-fitting manner are formed by molding on one of the side wall surfaces of the side plate 4 at the positions corresponding to the mating cylindrical projections 3a of the casing 2. The corresponding projections 3a and inserting holes 4a are joined in a snap-fitting manner since the projections each have an enlarged peripheral portion 3c that is slightly larger than the inner diameter of the mating inserting hole 4a. Thus the side plates 4 can be securely fixed on to both end wall surfaces of the casing 2 by a simplest operation. At the same time, the casing-side track grooves 2a and the relative ball return passages 5 are coupled at both end portions of them by the ball direction return passages 6 provided by the side plate 4, thereby completing endless ball circulating passages in the unit 10.

Different from the first embodiment of the invention, in the third embodiment, as shown in FIGS. 8 to 10, a plurality of snap-fitting type projections 3a and the inserting holes 4a corresponding thereto are provided, in the upper and lower parts, respectively, on both the longitudinally opposing end wall surfaces of the casing 2 and the mating side wall surfaces of the side plates 4, respectively, thus, both of the casing 2 and the side plate 4 can be securely and rigidly attached together.

It should be appreciated that the fixing method of the side plates with the casing according to the present invention is not limited to the above-mentioned first to third embodiments only but any of the well-known snap-fitting type methods can be likewise employed.

On the other hand, although balls are used as rolling members in the respective embodiments according to the present invention, rolling rollers can also be used in the similar and slightly modified construction. Therefore, the invention can be applied to various kinds of linear motion rolling guide units.

The main component parts such as track rail, casing, side plates, and the like of the linear motion rolling guide unit 10 according to the present invention are made of a high performance engineering resin according to the invention. Therefore, the casing and side plates can be fixedly attached by using, for instance, a simple and well-known snap-fitting type concave/convex engagement method. The component parts can be easily molded and worked. Further, the number of component parts can be fairly reduced. The weight and the manufacturing costs can also be reduced.

The following advantages are obtained according to the invention.

(1) The direction turning passages, return passages, and track surfaces can be easily and accurately positioned so that the slide resistance of the rolling members when they run along the endless ball circulating passage is made small to the maximum extent.

(2) As compared with the unit made of steel, elastic deformation rate is made large, the weight is made small, the aligning performance is made high, and the unit as a whole can endure severe operating conditions.

(3) The unit can be easily worked and cheaply manufactured.

(4) The number of parts can be reduced.

(5) The linear motion rolling guide unit can be easily assembled.

(6) The unit can also be used under special operating conditions, that is, under the physically and chemically severe conditions.

The present invention is not limited to the foregoing embodiments but many modifications and variations are possible within the spirit and scope of the appended claims of the invention. Namely, the present invention also includes in its technical scope that regarding the second embodiment, the arcuate bridge-shaped U-turn track 3d may be modified in the configuration as will be obvious in the art so far as it achieves the same or similar action. Moreover, the present invention further includes such an embodiment, for example, that in the first embodiment, the side plates to be fitted onto both the longitudinally opposite end walls of the casing can be eliminated, especially when the resin used in the formation of the casing has a strong mechanical strength.

Further, in the respective embodiments according to the present invention, it is apparent that the plurality of generally cylindrical projections 3a may be provided on one of the side wall surfaces of the side plate 4, while at the corresponding positions on the mating end wall surface of the casing 2 are provided the mating projection inserting holes 4a.

What is claimed is:

1. A linear motion rolling guide unit (10) comprising:
 a square pillar-shaped long track rail (1);
 rail-side track grooves (1a) formed on both side surfaces of the track rail (1) in an extended symmetrical relation relative to its longitudinal axis;
 a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);
 corresponding to the rail-side track grooves (1a) being formed casing-side track grooves (2a) on both the opposite inner side walls of said laterally opposite leg portions (2d) of the casing (2), extending by a distance slightly shorter than the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being provided arc-shaped direction turning passages (6), thereby forming an endless ball circulating passage within each of the laterally opposite leg portions (2d), a number of rolling members (8) being inserted between both the facing track grooves (1a and 2a) as well as within said endless ball circulating passage, and a pair of side plates (4) each having a cross-sectional shape conforming to the cross-sectional shape of the casing (2) and adapted to be integrally attached to both the longitudinally end wall surfaces of the casing (2);
 said unit is characterized in that
 the track rail (1), casing (2), and side plates (4) are made of high performance engineering plastics,
 a plurality of generally cylindrical projections (3a or 3b) longitudinally project on the longitudinally end wall surfaces of said casing (2) with the corresponding number of projection inserting holes (4a) each having a diameter slightly smaller than said cylindrical projection (3a or 3b) being correspondingly formed on the side wall surfaces of said side plates (4) so that said side plates (4) may be integrally fixed on both end wall surfaces of the casing (2) in a snap-fitting fashion.

2. A unit according to claim 1, wherein said rolling members are balls made of plastics, stainless steel, glass, or ceramics.

3. A unit according to claim 2, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

4. A unit according to claim 1, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

5. A linear motion rolling guide unit (10) comprising:
 a square pillar-shaped long track rail (1);
 rail-side track grooves (1a) formed on both side surfaces of the track rail (1) in an extended symmetrical relation relative to its longitudinal axis;
 a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);
 corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being integrally provided, on each of the longitudinally opposite end wall surfaces of the casing (2), arcuate bridge-shaped U-turn tracks (3d), a pair of side plates (4) each having a cross-sectional shape conforming to the cross-sectional shape of the casing (2), adapted to be integrally attached to both the longitudinally end wall surfaces of the casing (2), and a number of rolling members (8) being inserted between both the facing track grooves (1a and 2a); said unit is characterized in that the track rail (1), casing (2), and side plates (4) are made of high performance engineering plastics, each of the above-mentioned side plates (4) has, on the casing-side side wall, horizontally semicircular recesses (6') at the horizontally symmetrical positions, adapted to snugly receive the above-mentioned arcuate bridge-shaped U-turn tracks (3d) therein in a snap-fitting fashion, thereby enabling to securely fitting said side plates (4) onto the longitudinally opposing end wall surfaces of the casing, while at the same time, forming arcuate direction turning passages (6) between the U-turn tracks (3d) and the inner wall surfaces of said horizontally semicircular recesses (6') so as to form endless ball circulating passages within the respective laterally opposite leg portions (2d) of the casing (2).

6. A unit according to claim 5, wherein positioning guide projections (3e) are formed on the arcuate bridge-shaped U-turn tracks (3d), adapted to be inserted and fixed into corresponding positioning guide grooves (4d) formed at opening edges of the direction turning passages (6) on the side surfaces of each side plate (4), thereby forming the arc-shaped direction turning passages (6).

7. A unit according to claim 6, wherein said rolling members are balls made of plastics, stainless steel, glass, or ceramics.

8. A unit according to claim 6, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

9. A unit according to claim 5, wherein said rolling members are balls made of plastics, stainless steel, glass, or ceramics.

10. A unit according to claim 5, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

11. A linear motion rolling guide unit (10) comprising:

a square pillar-shaped long track rail (1);
rail-side track grooves (1a) formed on both side surfaces of the track rail (1) in an extended symmetrical relation relative to its longitudinal axis;

a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1);

corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being integrally provided, on each of the longitudinally opposite end wall surfaces of the casing (2), arcuate bridge-shaped U-turn tracks (3d);

a pair of side plates (4) each having a cross-sectional shape conforming to the cross-sectional shape of the casing (2), adapted to be integrally attached to both the longitudinally end wall surfaces of the casing (2); and a number of rolling members (8) being inserted between both the facing track grooves (1a and 2a); said unit is characterized in that the track rail (1), casing (2), and side plates (4) are made of high performance engineering plastics, each of the above-mentioned side plates (4) has, on the casing-side side wall, horizontally semicircular recesses (6') at the horizontally symmetrical positions, adapted to snugly receive the above-mentioned arcuate bridge-shaped U-turn tracks (3d) therein and a plurality of generally cylindrical projections (3a and 3b) longitudinally project on the longitudinally end wall surfaces of said casing (2) with the corresponding number of projection inserting holes (4a) each having a diameter slightly smaller than said cylindrical projection being correspondingly formed on the mating side wall surfaces of said side plates (4), thereby enabling to securely fit said side plates (4) onto the longitudinally opposing end wall surfaces of the casing in a snap-fitting fashion, while at the same time, forming arcuate direction turning passages (6) between the U-turn tracks (3d) and the inner wall surfaces of said horizontally semicircular recesses (6') in the side plates so as to form endless ball circulating passages within the respective laterally opposite leg portions (2d) of the casing (2).

12. A unit according to claim 11, wherein positioning guide projections (3e) are formed on the arcuate bridge-shaped U-turn tracks (3d), adapted to be inserted and fixed into corresponding positioning guide grooves (4d) formed at opening edges of the direction turning passages (6) on the side surfaces of each side plate (4), thereby forming the arc-shaped direction turning passages (6).

13. A unit according to claim 11, wherein said rolling members are balls made of plastics, stainless steel, glass, or ceramics.

14. A unit according to claim 11, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

15. A linear motion rolling guide unit (10) comprising:
a square pillar-shaped long track rail (1);
rail-side track grooves (1a) formed on both side surfaces of the track rail (1) in an extended symmetrical relation relative to its longitudinal axis;
a casing (2) having an inverse U-shaped cross section in which a concave portion (2c) having a cross-sectional shape substantially corresponding to the cross-sectional shape of the upper portion of the track rail (1) is formed in the lower portion of the casing (2), thereby defining laterally opposite leg portions (2d) on both sides thereof, within said concave portion (2c) being slidably mounted said track rail (1); corresponding to the rail-side track grooves (1a) being formed casing-side track grooves (2a) on both the opposite inner side walls of said laterally opposite leg portions (2d) of the casing (2), extending by a distance equal to the longitudinal length thereof, while within said laterally opposite leg portions (2d) are formed rolling member return passages (5) extending in parallel to the casing-side track grooves (2a) in horizontal symmetrical relation on the cross section of the casing (2) and, connecting both ends of each of said casing-side track grooves (2a) with both ends of each of the corresponding rolling member return passages (5) being provided;
a pair of side plates (4) each having a cross-sectional shape conforming to the cross-sectional shape of the casing (2), adapted to be integrally attached to both the longitudinally end wall surfaces of the casing (2); and
a number of rolling members (8) being inserted between both the facing track grooves (1a and 2a);
said unit is characterized in that
the track rail (1), casing (2), and side plates (4) are made of high performance engineering plastics,
a plurality of generally cylindrical projections (3a and 3b) longitudinally project on the longitudinally end wall surfaces of said casing (2) with the corresponding number of projection inserting holes (4a) each having a diameter slightly smaller than said cylindrical projection being correspondingly formed on the mating side wall surfaces of said side plates (4) and each of the above-mentioned side plates (4) has, on the casing-side side wall, the arc-shaped direction turning passage (6") provided at the horizontal symmetrical positions on the cross-sectional surface of each of the side plates (4), which has been formed by forming a notch having a semicircular horizontal cross section in each side plate, then centrally inserting and fixing a circulating passage spacer (7) having a smaller but analogous semicircular horizontal cross section into the notch, and by press-fitting the side plates (4) onto both longitudinally end wall surfaces of the casing (2) in
a snap-fitting manner, thereby forming the arc-shaped direction turning passages (6) in each of the side plates, endless ball circulating passages are formed within said casing (2).

16. A unit according to claim 5, wherein said rolling members are balls made of plastics, stainless steel, glass, or ceramics.

17. A unit according to claim 15, wherein said track rail (1), casing (2), side plates (4), and circulating passage spacers (7) are made of high performance engineering plastics such as PEEK resin, PES resin, PPS resin, PI resin, PAI resin, denaturation PPO resin, or PEI resin.

* * * * *